(12) United States Patent
Fine

(10) Patent No.: US 10,753,851 B2
(45) Date of Patent: Aug. 25, 2020

(54) CLASSIFYING MICROBEADS IN NEAR-FIELD IMAGING

(71) Applicant: Alentic Microscience Inc., Halifax (CA)

(72) Inventor: Alan Marc Fine, Prospect (CA)

(73) Assignee: Alentic Microscience Inc., Halifax NS ( * ) Notice: Subject to any disclaimer, the term of this patent is extended or adjusted under 35 U.S.C. 154(b) by 0 days.

(21) Appl. No.: 16/197,265

(22) Filed: Nov. 20, 2018

(65) Prior Publication Data

US 2019/0162648 A1    May 30, 2019

Related U.S. Application Data

(60) Provisional application No. 62/591,427, filed on Nov. 28, 2017.

(51) Int. Cl.
*G01N 15/14* (2006.01)
*G01N 15/02* (2006.01)
(Continued)

(52) U.S. Cl.
CPC ..... *G01N 15/1475* (2013.01); *G01N 15/0205* (2013.01); *G01N 15/1463* (2013.01); *G02B 27/0031* (2013.01); *G02B 27/1013* (2013.01); *G02B 27/46* (2013.01); *G06E 3/005* (2013.01); *B82Y 10/00* (2013.01); *B82Y 20/00* (2013.01); *G01N 2015/1465* (2013.01); *G01N 2015/1472* (2013.01); *G01N 2015/1493* (2013.01)

(58) Field of Classification Search
CPC ........... G01N 15/1475; G01N 15/0205; G01N 2015/1472; G02B 27/46; G02B 27/0031; G02B 27/1013; G06E 3/005
See application file for complete search history.

(56) References Cited

U.S. PATENT DOCUMENTS 6,159,748 A    12/2000  Hechinger
6,515,289 B1    2/2003  Kask
(Continued)

FOREIGN PATENT DOCUMENTS

TW          I503531        10/2015
WO      WO 2011/053631      5/2011

OTHER PUBLICATIONS

USPTO transaction history of U.S. Appl. No. 62/591,427.
(Continued)

*Primary Examiner* — Phuoc Tran
(74) *Attorney, Agent, or Firm* — Fish & Richardson P.C.

(57) ABSTRACT

Among other things, an imaging sensor includes a two-dimensional array of photosensitive elements and a surface to receive a sample within a near-field distance of the photosensitive elements. Electronics classify microbeads in the sample as belonging to different classes based on the effects of different absorption spectra of the different classes of microbeads on light received at the surface. In some examples, the number of different distinguishable classes of microbeads can be very large based on combinations of the effects on light received at the surface of the different absorption spectra together, spatial arrangements of colorants in the microbeads that impart the different absorption spectra, different sizes of microbeads, and different shapes of microbeads, among other things.

39 Claims, 2 Drawing Sheets

Figure 1:
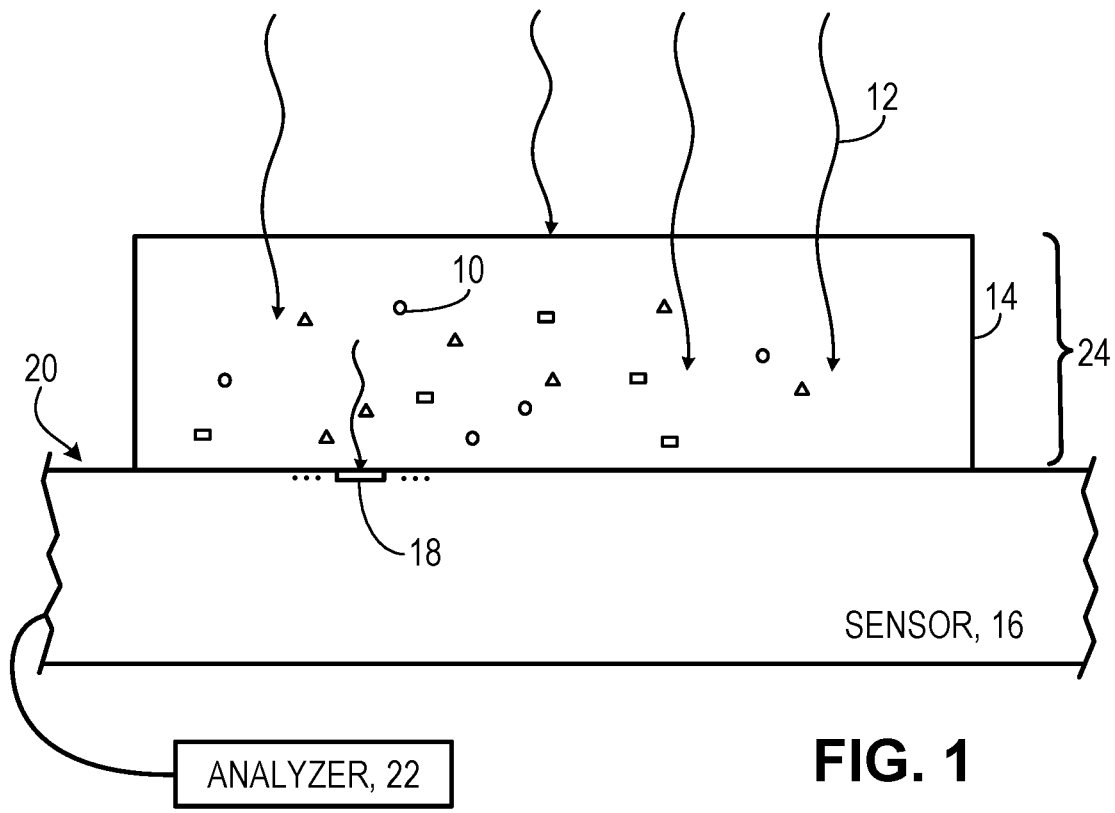

(51) Int. Cl.
*G02B 27/10* (2006.01)
*G02B 27/00* (2006.01)
*G06E 3/00* (2006.01)
*G02B 27/46* (2006.01)
*B82Y 10/00* (2011.01)
*B82Y 20/00* (2011.01)

(56) References Cited

U.S. PATENT DOCUMENTS

| | | | |
|---|---|---|---|
| 7,225,082 B1 | 5/2007 | Natan et al. | |
| 8,269,965 B2 | 9/2012 | Kask | |
| 8,921,277 B2 | 12/2014 | Kiesel et al. | |
| 9,268,983 B2 | 2/2016 | Moon | |
| 2004/0175842 A1 | 9/2004 | Roitman et al. | |
| 2009/0169892 A1* | 7/2009 | Bazzi | B01J 13/02 428/404 |
| 2012/0157160 A1 | 6/2012 | Ozcan et al. | |
| 2014/0087871 A1 | 3/2014 | Kruglick | |
| 2014/0087971 A1* | 3/2014 | Kiesel | G01N 21/6452 506/12 |
| 2015/0285729 A1 | 10/2015 | Chan | |

OTHER PUBLICATIONS

Balsam, J., et al. "Lensless CCD-based fluorometer using a micromachined optical Stöller collimator", Lab on a Chip, 11(5), 941-949, 2011 (9 pages).

Coskun, A. F., et al, Lensless Fluorescent Microscopy on a Chip. Journal of Visualized Experiments : JoVE, (54), 3181. Advance online publication. http://doi.org/10.3791/3181, 2011 (9 pages).

Guo, N., et al. "CMOS time-resolved, contact, and multispectral fluorescence imaging for DNA molecular diagnostics", Sensors, 14(11), 20602-20619, 2014 (18 pages).

Isikman, S. O., et al. "Color and monochrome lensless on-chip imaging of Caenorhabditis elegans over a wide field-of-view". Lab on a Chip, 10(9), 1109-1112, 2010 (9 pages).

Mudraboyina, A. K., et al. "A novel lensless miniature contact imaging system for monitoring calcium changes in live neurons". IEEE Photonics Journal, 6(1), 1-15, 2014 (16 pages).

International Search Report and Written Opinion from corresponding PCT application PCT/CA2018/051476 dated Feb. 19, 2019 (16 pages).

Taiwan Office Action in Taiwanese Application No. 107142212, dated Aug. 14, 2019, 9 pages with English translation.

U.S. Appl. No. 62/591,427, filed Nov. 28, 2017—Pending.

Taiwan Office Action in Taiwanese Application No. 107142212, dated Mar. 31, 2020, 7 pages with English Translation.

* cited by examiner

CLASSIFYING MICROBEADS IN NEAR-FIELD IMAGING

CROSS-REFERENCE TO RELATED APPLICATIONS

This application claims priority to and the benefit of U.S. provisional application No. 62/591,427, filed on Nov. 28, 2017, which is incorporated here by reference in its entirety.

BACKGROUND

This description relates to classifying microbeads in near-field (e.g., contact) imaging.

Fluorescent microbeads, for example, are sometimes used in assays as labels for target elements (for example, antigens) that become bound to the microbeads. Microbeads having different known fluorescence spectra when stimulated by a source of light of known spectral properties can be bound to respective specificities of (capture) antibodies. The presence of different kinds of antigens in a sample can then be determined by incorporating in the sample the various different microbeads and additional (detection) antibodies with specificities for the same set of antigens, so that the antigens bind both to the capture antibodies and the detection antibodies. If all the detection antibodies are conjugated to an identical fluorophore with emission different from the beads, by illuminating the sample using light of known source spectra and detecting the resulting localized fluorescence spectra emitted by the microbeads and their bound detection antibodies, it is possible to determine the presence and concentration within the sample of the various different individual antigens of particular classes. In this sense, by classifying the microbeads according to their fluorescence spectra, the antigens can in turn be classified and quantified.

(See Luminex Multiplex Assays, https://www.thermofisher.com/us/en/home/life-science/protein-biology/protein-assays-analysis/luminex-multiplex-assays.html?gclid=CjOKCQiAjO_QBRC4ARIsAD2FsXOUygv-JRllcjeahqmk8 Yd-9gxKTx8Rq5PhI_b9PTwYb2PbBGuvjNfwaAvw6EALw_w cB&s_kwcid=AL!3652!3!211105705124!e!!g!!luminex%20assay&ef_id=Wfz7gAAAAIMHHhyY:201711-27205444:s)

SUMMARY

In general, in an aspect, an imaging sensor includes a two-dimensional array of photosensitive elements and a surface to receive a sample within a near-field distance of the photosensitive elements. Electronics classify microbeads in the sample as belonging to different classes based on the effects of one or more characteristics of the different classes of microbeads on light received at the surface.

In some examples, the number of different distinguishable classes of microbeads can be very large based on combinations of the effects on light received at the surface of various characteristics including the different absorption spectra, spatial arrangements of colorants in the microbeads that impart the different absorption spectra, different sizes of microbeads, and different shapes of microbeads, among other things.

Implementations may include one or a combination of two of more of the following features. The one or more characteristics include absorption spectra. The one or more characteristics include ratios of intensities of different colors of microbeads of different classes. The one or more characteristics include different sizes of microbeads of different classes. The one or more characteristics include different shapes of microbeads of different classes. The number of different classes of microbeads has a combinatorial relationship to the number of different characteristics. The microbeads of the different classes have different absorption spectra imparted by different colorings. The colorings are distributed evenly within each of the microbeads. The colorings are distributed unevenly within each of the microbeads. The colorings are at least partially on the surface of each of the microbeads. The colorings are at least partially internal to each of the microbeads. The different colorings are present in predetermined ratios. The different colorings are present in equal ratios. The different colorings are present in non-equal ratios. The electronics are to classify the microbeads-based also on at least one other characteristic that differs between different classes of the microbeads. There is a light source that has selectable source spectra. The light source includes light emitting diodes. There is a controller to control the light source to have a selected source spectrum. The controller is to control the electronics and the light source to capture a sequence of images of the sample using different respective source spectra. The other characteristic includes fluorescence spectra. The other characteristic includes sizes of the microbeads. The other characteristic includes shapes of the microbeads. The electronics are to count microbeads of different classes in the sample. The electronics are to determine the locations of microbeads of different classes in the sample. The electronics are to determine a phenotype of individual cells based on their surface expression of particular molecules. The electronics are to determine concentrations of different substances in the sample. Each of the microbeads has a characteristic or can be coupled or attached to another unit that has a characteristic that will bind or couple or connect or otherwise become associated with a corresponding target element in the sample. The target element includes at least one of an antigen, a hormone, a biomarker, a drug, a viral capsid, a pathogen-directed antibody, an oligonucleotide, of another molecule, cell or particle. The other unit includes at least one of an antibody, a capsid protein, or other antigen from a pathogenic virus.

In general, in an aspect, a first set of microbeads has an absorption spectrum selected to have a predetermined relationship to an absorption spectrum of a second set of microbeads.

Implementations may include one or a combination of two of more of the following features. The microbeads of at least the first set have two or more absorption spectra. The absorption spectra are imparted by colorings. The colorings include ratios of intensities of different colorings of microbeads of a given class. The first set of microbeads include different sizes of microbeads. The first set of microbeads comprise different shapes of microbeads. The colorings are distributed evenly within each of the microbeads. The colorings are distributed unevenly within each of the microbeads. The colorings are at least partially on the surface of each of the microbeads. The colorings are at least partially internal to each of the microbeads. The colorings are present in predetermined ratios. The colorings are present in equal ratios. The colors are present in non-equal ratios. The microbeads of the first set and second set include characteristics or elements to link them physically to corresponding different sets of target elements. A sample or other medium contains the first set of microbeads and the second set of microbeads In general, in an aspect, classes of microbeads having different absorption spectra are added to a sample. The microbeads of respective classes are bound, coupled, connected, or otherwise associated with another unit. The other unit has a characteristic that will bind or couple or connect or otherwise become associated with a corresponding target element in the sample. The sample is imaged within a near-field distance of a two-dimensional array of photosensitive elements. The microbeads of the respective classes are assayed, counted, classified, analyzed, or otherwise studied using the image of the sample.

These and other aspects, features, and implementations can be expressed as methods, apparatus, systems, components, program products, methods of doing business, means or steps for performing a function, and in other ways.

These and other aspects, features, and implementations will become apparent from the following descriptions, including the claims.

DESCRIPTION

Figure 2:
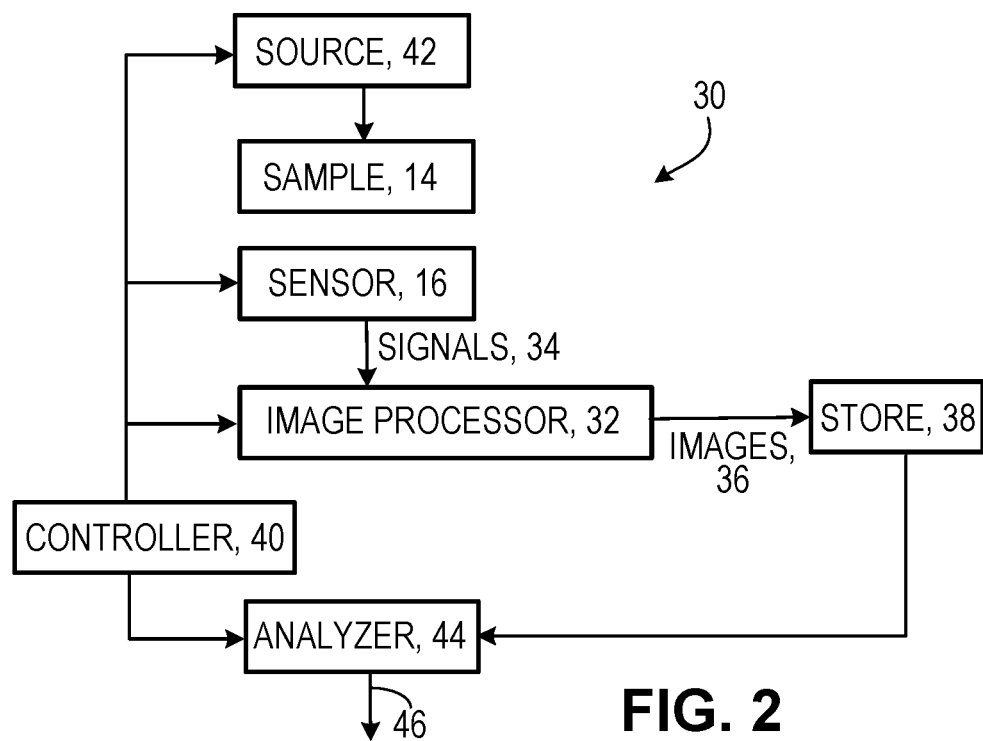
Figure 3:
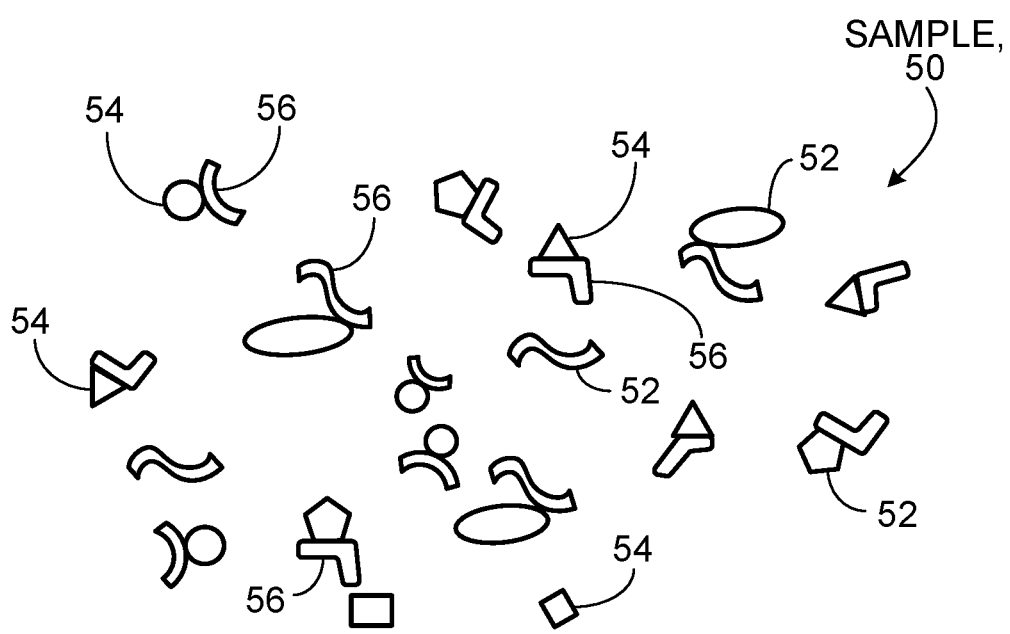

FIG. 1 is a schematic side view of a sample on a sensor.
FIG. 2 is a block diagram of an analysis system.
FIG. 3 is a schematic view of the sample.

The technology that we describe here takes advantage of different optical properties (in particular, different absorption spectra) of microbeads to classify and determine locations of individual microbeads (e.g., small polymer particles) in a sample held within the near-field of a near-field (e.g., contact) imaging sensor.

We use the term microbeads broadly to include, for example, particles having a size within a range such as 0.5 µm to 50 µm, including, for example, particles formed of a polymer, silica, magnetite, gold, carbon, cadmium selenide, nucleic acid, bacteria or other microorganisms, or other material, particles sharing a common size or size range, particles that are spherical or of another shape, and particles that have a variety of optical or other differentiating properties including particular fluorescence spectra and absorption spectra. Microbeads include units that are sometimes referred to as microspheres, nanospheres, nanobeads, or nanoparticles, or by other terminology.

By associating microbeads of different classes with respective target elements in the sample—for example, by attaching them to antibodies, aptamers or other specific ligands that bind respectively to different target classes of molecules—the optical properties of the microbeads encode information about the sample which may otherwise be undetectable by conventional microscopy imaging.

The ability to classify and determine the locations of individual microbeads (and hence of corresponding target elements) within a sample located on a near-field imaging sensor can be useful in a variety of applications, such as cytometry, in vitro diagnostics, environmental analysis, multiplex biochemical assays, serology, and gene expression, to name just a few.

As shown in FIG. 1, in some implementations of the technology that we describe here, different predetermined light absorption characteristics are imparted to different respective classes of microbeads 10. In FIG. 1, the different classes of microbeads are identified schematically by their shape: round, square, or triangular. Then, the spectral characteristics of source light 12 that strikes the sample 14 (including the microbeads 10) and then reaches the near-field imaging sensor 16 and the absorption characteristics of the microbeads in the sample will determine the spectral properties of the light detected and measured by the light-sensitive elements (e.g., pixels 18) exposed at the light-sensitive surface 20 of the near-field imaging sensor. Using information about the known spectral properties of the incident light, the absorption characteristics of the microbeads, and the light measurements of the light-sensitive elements, an analyzer 22 can classify a very large number of microbeads present in the sample and can determine their locations with respect to a two-dimensional image field associated with the light-sensitive surface of the sensor.

The number of different individual microbeads that can be identified, classified, and located in the sample will depend on (a) the number and size of microbeads in the sample, (b) the extent to which the thickness 24 of the sample allows microbeads to obscure one another with respect to the sensor, (c) the number and size of pixels at the light-sensitive surface (e.g., the pixel resolution of the near-field imaging sensor), (d) the spectral and absorption characteristics of the light source and the microbeads, and (e) the number of different classes of microbeads, among other factors. Taking these factors into account, the number of different microbeads that can be identified, classified, and located could be as large as 10,000 or more.

An advantage of the technology that we describe here is that the number of different classes of microbeads that can be labeled and then classified using different absorption characteristics can be relatively large, for example, any number of classes from two to ten or twenty or fifty or five hundred or potentially even more. (Only three different classes are shown in FIG. 1.)

In a system in which multiple classes of microbeads are to be distinguished from one another, different colors can be imparted to the microbeads so that the spectra of the source light as affected by the absorption spectra of the microbeads of the respective classes can be detected and measured at the light-sensitive surface of the near-field imaging sensor and used to differentiate the different classes.

The absorption spectra of a given class of microbeads can be controlled and determined in a variety of ways. For example, in some implementations, dyes or other colorants can be added to the polymeric or other material used to form the microbeads. In some cases, dyes or colorants can be used to color the surfaces of already formed microbeads. In some cases, combinations of internal coloring and surface coloring could be used. Examples of dyes and colorants that could be used include a wide range of organic dyes and pigments such as anthracene dyes, aniline dyes, safranin dyes, thiazole dyes, to name only a few; and inorganic colorants such as ions including nickel, cobalt, manganese, to name only a few. In some cases the colorants may be transparent rather than opaque. In addition to obtaining such transparent colors by electron-dependent spectral absorption, the colors could be achieved by interference-dependent effects (e.g., iridescence), although those may be less useful.

To impart different absorption spectra to different classes of microbeads, dyes or colorants of different colors can be mixed. A wide range of different colors in a broad gamut of colors can be used to impart different absorption spectra to a large number of different classes microbeads, provided that all of the resulting absorption spectra can be differentiated, given the spectra of the source light or lights and the ability of the near-field imaging sensor to detect or discriminate among them.

In some cases, the near-field imaging sensor is a monochrome sensor that detects and measures variations in light intensity, but does not differentiate different wavelengths or different spectra. In some implementations, the spectra of source light and the different absorption spectrum of the different classes microbeads are selected to improve the ability of the near-field imaging sensor to discriminate different classes of microbeads based on different grayscale values for the resulting received light.

In some implementations, the ability of the near-field imaging sensor to discriminate different classes of microbeads is enhanced by capturing a set of successive images based on different corresponding spectra of the source light. For example, three images could be captured using, respectively, red, green, and blue source light. Multiple classes of microbeads having uniquely different combinations (ratios) of red, green, and blue absorption spectra could then be classified and located by analyzing the images. Different classes of the microbeads could have distinctive non-even distributions (e.g., ratios) of colorings, usefully and significantly increasing the number of distinguishable classes of microbeads. For example, microbeads could be made with one half (i.e., one hemisphere) bearing one color, and the other half another color. Then, given a system capable of discriminating n colors, it is possible to make microbeads belonging to be n+(n−1)+(n−2)+ . . . , different classes of distinguishable microbeads for each distinguishable combination of size and shape. This combinatorial expansion can enormously increases the number of distinguishable classes of microbeads. In some examples, the number of different distinguishable classes of microbeads can be very large based on combinations of the effects on light received at the surface of the different absorption spectra together, spatial arrangements of colorants in the microbeads that impart the different absorption spectra, different sizes of microbeads, and different shapes of microbeads, among other things.

In some examples, the number of different distinguishable classes of microbeads can be very large based on combinations of the effects on light received at the surface of the different absorption spectra together, spatial arrangements of colorants in the microbeads that impart the different absorption spectra, different sizes of microbeads, and different shapes of microbeads, among other things.

The one or more possible distinguishing characteristics of the microbeads need not be limited to absorption spectra. The one or more characteristics include ratios of intensities of different colors of microbeads of different classes. The one or more characteristics include different sizes of microbeads of different classes. The one or more characteristics include different shapes of microbeads of different classes. The number of different classes of microbeads has a combinatorial relationship to the number of different characteristics. The microbeads of the different classes have different absorption spectra imparted by different colorings. The colorings are distributed evenly within each of the microbeads. The colorings are distributed unevenly within each of the microbeads. The colorings are at least partially on the surface of each of the microbeads. The colorings are at least partially internal to each of the microbeads. The different colorings are present in predetermined ratios. The different colorings are present in equal ratios. The different colorings are present in non-equal ratios.

The number of different classes of microbeads that can be discriminated could be further increased significantly by combining different color ratios with different sizes or shapes (or both) of the microbeads that are different enough to be discriminated. By discriminating different color ratios of absorption and emission in each of four measured wavebands, the number of differentiable classes can be in the thousands. As shown in FIG. 2, the near-field imaging sensor 16 can be part of an analytical system 30 that includes an image processor 32 to receive image signals 34 from the near-field imaging sensor, to process them into digital images, and to store the digital images 36 in a storage 38. To acquire the images, a controller 40 controls the switching on and off of a light source 42 and selects the source spectra of the light produced by the light source. For this purpose, the light source can be an array of LEDs that includes, for example, UV, violet, red, blue, and green LEDs that can be selectively illuminated. The controller manages a sequence (e.g., three) of image capture events in each of which a selected source spectrum is used and an image is captured. Once the sequence has been completed, the controller can cause an analyzer 44 to analyze the sequence of images to identify microbeads in the sample, classify the microbeads, count the microbeads of each class, and identify their locations. Information 46 about each of the microbeads and the classes of microbeads can then be stored and used by a variety of applications. The numbers, classifications, and distributions in the sample of different classes of microbeads can be used to determine or understand the phenotype of individual cells on the basis of their surface expression of particular molecules (e.g., "cluster of differentiation" antigens), the concentrations of multiple substances in a microscopic sample (e.g., of different serum proteins in a microdrop of blood) on the basis of mean fluorescence associated with different bead types, and a very wide range of other qualitative and quantitative analyses.

The absorption color-ratio beads described above could be coupled to antibodies that bind to specific cell surface molecules that, e.g., distinctively identify different classes of normal or cancerous cells; the availability of many distinguishable classes of beads would then permit simultaneous detection of many different classes of cells (actually many more than the number of classes of beads, because cells could be characterized by the combinatorial presence or absence (or even quantitative levels) of different cell surface molecules.

One use of these microbeads would be for (highly) multiplexed chemical analyses, in which case the distributions of components in a serum or other fluid sample is usually not relevant, assuming that the sample is spatially homogeneous.

As shown in FIG. 3, to use the system, a sample 50 (typically though not necessarily, a liquid or fluid sample) is obtained or prepared that includes classes of target elements 52 to be assayed, counted, classified, analyzed, or otherwise studied. Again, the classes are indicated schematically by their shapes. Examples of such elements include, but are not limited to, antigens, hormones, biomarkers, drugs, viral capsids, pathogen-directed antibodies, oligonucleotides, and other molecules, cells and particles. The target elements may already be part of a sample, such as a blood sample, or the sample may be created by combining various components. Microbeads 54 belonging to as many different classes as the different classes of elements to be analyzed are added to the sample. Each class of microbeads will be associated with a corresponding one of the classes of the elements. The number of individual microbeads of each class added to the sample depends on (e.g., could be at least approximately twice) the number of individual target elements anticipated to be present in the corresponding class of elements in the sample.

Each of the microbeads of a given class has a characteristic or can be coupled or attached to another unit 56 that has a characteristic that will bind or couple or connect or otherwise become associated with one of the target elements in the sample that belongs to the class associated with the class of microbeads. The other unit could be, for example, an antibody of a known type, e.g., an antibody directed against a "cluster of differentiation" cell surface antigen if the target is a specific cell type; or the other unit could be capsid proteins or other antigens from a pathogenic virus, if the target is antibodies to that virus (as evidence of prior exposure to the pathogen), subsequently made visible by addition of fluorescent anti-immunoglobulin detection antibody. Therefore, once the microbeads (and any related units) are mixed in the sample, the microbeads effectively label or mark elements of the corresponding class in a way that can allow differentiation of different classes the target elements using size and absorption spectra of the microbeads, among other things.

Other components can be included in or added to the sample for a wide variety of other purposes.

The sample is then placed on the light-sensitive surface of the near-field imaging sensor either statically or in a flowing fluid passing across the light-sensitive surface. The placing of the sample can be done in a wide variety of ways, including using a sample chamber. Sample chambers and other methods of placing the sample are described, for example, in U.S. patent application Ser. No. 15/482,215, filed on Apr. 7, 2017, the entire contents of which are incorporated here by reference.

Once the sample is in place, the controller triggers a sequence of images and the analyzer executes its processing.

In some applications, for example, to detect anti-HIV antibodies, beads coupled to HIV protein are added to the blood sample along with fluorescent-labeled anti-immunoglobulin antibodies. After suitable incubation time, the bead-containing sample is loaded onto the contact optical microscope, a monolayer is formed to stabilize the beads, and at least a pair of images is taken in fluorescence and transmitted-light microscopic modes. The two images are computationally overlaid; the transmitted light image is used to identify the HIV-test beads, and fluorescence associated with such beads is evidence of the presence of anti-HIV antibodies denoting prior exposure to the virus.

Other implementations are also within the scope of the following claims.

For example, a similar strategy can be used to measure the presence and level of virtually any protein, hormone or biomarker in the blood or in other fluid samples such as saliva or cerebrospinal fluid.

The invention claimed is:

1. An apparatus comprising
an imaging sensor comprising a two-dimensional array of photosensitive elements and a surface to receive a sample held statically within a near-field distance of the photosensitive elements, the imaging sensor configured to capture a two-dimensional image of the sample held statically within the near-field distance of the photosensitive elements, including microbeads and other discrete components of the sample, and
electronics to (a) generate a two-dimensional image of the statically held sample including the microbeads and other discrete components of the sample, (b) classify the microbeads in the two-dimensional image of the statically held sample as belonging to different classes based on the effects of one or more characteristics of different classes of the microbeads on light received at the surface, (c) count the microbeads of each of the different classes in the two-dimensional image of the statically held sample, and (d) identify locations of the microbeads of each of the different classes in the two-dimensional image.

2. The apparatus of claim 1 in which the one or more characteristics comprise absorption spectra.

3. The apparatus of claim 1 in which the one or more characteristics comprise ratios of intensities of different colors of microbeads of different classes.

4. The apparatus of claim 1 in which the one or more characteristics comprise different sizes of microbeads of different classes.

5. The apparatus of claim 1 in which the one or more characteristics comprise different shapes of microbeads of different classes.

6. The apparatus of claim 1 in which a number of different classes of microbeads has a combinatorial relationship to a number of different characteristics.

7. The apparatus of claim 1 in which the microbeads of the different classes have different absorption spectra imparted by different colorings.

8. The apparatus of claim 7 in which the colorings are distributed evenly within each of the microbeads.

9. The apparatus of claim 7 in which the colorings are distributed unevenly within each of the microbeads.

10. The apparatus of claim 7 in which the colorings are at least partially on the surface of each of the microbeads.

11. The apparatus of claim 7 in which the colorings are at least partially internal to each of the microbeads.

12. The apparatus of claim 7 in which the different colorings are present in predetermined ratios.

13. The apparatus of claim 12 in which the different colorings are present in equal ratios.

14. The apparatus of claim 12 in which the different colorings are present in non-equal ratios.

15. The apparatus of claim 1 in which the electronics are to classify the microbeads based also on at least one other characteristic that differs between different classes of the microbeads.

16. The apparatus of claim 15 in which the other characteristic comprises fluorescence spectra.

17. The apparatus of claim 15 in which the other characteristic comprises sizes of the microbeads.

18. The apparatus of claim 15 in which the other characteristic comprises shapes of the microbeads.

19. The apparatus of claim 1 comprising a light source that has selectable source spectra.

20. The apparatus of claim 19 in which the light source comprises light emitting diodes.

21. The apparatus of claim 19 comprising a controller to control the light source to have a selected source spectrum.

22. The apparatus of claim 21 in which the controller is to control the electronics and the light source to capture a sequence of images of the sample using different respective source spectra.

23. The apparatus of claim 1 in which the electronics are to determine a phenotype of individual cells based on their surface expression of particular molecules.

24. The apparatus of claim 1 in which the electronics are to determine concentrations of different substances in the sample.

25. The apparatus of claim 1 in which each of the microbeads has a characteristic or can be coupled or attached to another unit that has a characteristic that will bind or couple or connect or otherwise become associated with a corresponding target element in the sample.

26. The apparatus of claim 25 in which the target element comprises at least one of an antigen, a hormone, a biomarker, a drug, a viral capsid, a pathogen-directed antibody, an oligonucleotide, or another molecule, cell or particle.

27. The apparatus of claim 25 in which the other unit comprises at least one of an antibody, a capsid protein, or other antigen from a pathogenic virus.

28. The apparatus of claim 25, in which the other unit comprises capsid proteins or other antigens from a pathogenic virus, and in which the target comprises antibodies to the pathogenic virus.

29. The apparatus of claim 28, in which the sample includes fluorescent anti-immunoglobulin detection antibodies.

30. The apparatus of claim 25, in which the target element in the sample comprises antibodies.

31. The apparatus of claim 30, in which the electronics are to perform one or more of: assaying, counting, classifying, or analyzing the antibodies.

32. The apparatus of claim 30 in which the antibodies are directed against cluster-of-differentiation cell surface antigens.

33. The apparatus of claim 30 in which the antibodies comprise anti-HIV antibodies.

34. The apparatus of claim 1, in which the electronics are to perform serology based on one or more of the classification of the microbeads, the count of the microbeads, or the identification of the locations of the microbeads.

35. A method comprising
place a sample at a surface of an imaging sensor comprising a two-dimensional array of photosensitive elements,
the sample including (a) microbeads at least some of which are bound or coupled or connected or otherwise associated with antigens, (b) and antibodies at least some of which are bound or coupled or connected or otherwise associated with at least some of the antigens,
hold the sample statically within a near-field distance of the photosensitive elements,
use the imaging sensor to capture a two-dimensional image of the statically held sample including the microbeads,
count the microbeads belonging to each of two different classes in the two-dimensional image, or identify locations of the microbeads of each of the different classes in the two-dimensional image, or both, and
based on the count or the locations or both of the microbeads, assay, count, classify, or analyze the antibodies in the sample.

36. The method of claim 35 in which the antigens comprise capsid proteins or other antigens of a pathogenic virus.

37. The method of claim 35 in which the sample includes fluorescent anti-immunoglobulin detection antibodies.

38. The method of claim 35 in which the antibodies are directed against cluster-of-differentiation cell surface antigens.

39. The method of claim 35 in which the antibodies comprise anti-HIV antibodies.

* * * * *